United States Patent [19]
Moorman et al.

[11] Patent Number: 5,251,019
[45] Date of Patent: Oct. 5, 1993

[54] SOLID STATE COLOR IMAGE SENSOR USING A FIELD-STAGGERED COLOR FILTER PATTERN

[75] Inventors: Michael C. Moorman, Princeton, N.J.; Robert H. Hibbard, Fairport; Kenneth A. Parulski, Rochester, both of N.Y.

[73] Assignee: Eastman Kodak Company, Rochester, N.Y.

[21] Appl. No.: 918,875

[22] Filed: Jul. 24, 1992

Related U.S. Application Data

[63] Continuation of Ser. No. 646,130, Jan. 25, 1991.

[51] Int. Cl.$^5$ .................................................. H04N 9/07
[52] U.S. Cl. ............................................ 358/44; 358/41; 358/213.22
[58] Field of Search ................................ 358/41–44, 358/213.22, 213.11

[56] References Cited

U.S. PATENT DOCUMENTS

| | | | |
|---|---|---|---|
| 3,971,065 | 7/1976 | Bayer | 358/44 |
| 4,479,143 | 10/1984 | Watanabe et al. | 358/44 |
| 4,663,661 | 5/1987 | Weldy et al. | 598/44 |
| 4,896,207 | 1/1990 | Parulski | 358/44 |
| 5,008,739 | 4/1991 | D'Luna et al. | 358/44 |

FOREIGN PATENT DOCUMENTS

| | | | |
|---|---|---|---|
| 0219889 | 12/1983 | Japan | 358/44 |
| 0086982 | 5/1984 | Japan | 358/44 |
| WO86/01678 | 3/1986 | PCT Int'l Appl. | |

OTHER PUBLICATIONS

"Color Filters and Processing Alternatives for one-chip cameras" by K. A. Parulski (IEEE Trans. on Electronic device; ED-32, No. 8; Aug. 1985, pp. 1381-1389) described in p. 1, line 24.

"Color Imaging System Using a Single cco area Array" by P. L. P. Dillon et al (IEEE on Electronic Devices, ED-251 No. 2, Feb 1978, pp. 102-107).

*Primary Examiner*—James J. Groody
*Assistant Examiner*—Michael H. Lee
*Attorney, Agent, or Firm*—David M. Woods

[57] ABSTRACT

A sensor 11 for a video camera includes a color filter array 12 of color filter elements covering a like array 14 of image sensing elements. Two fields of a video frame are provided by interlaced transfer of image signals from the sensor 11. The color filter array 12 is configured in relation to the sensor array 14 such that at least 75% of the image sensing elements are luminance-sensing (e.g., green) elements and the rest are chrominance-sensing (e.g., red and blue) elements. Furthermore, the chrominance-sensing elements of the same type (red or blue) are separated in a horizontal direction by at least three luminance-sensing (green) elements. The horizontal sampling frequency of the chrominance-sensing elements is increased by arranging horizontal lines containing the chrominance-sensing elements of the same type in staggered line pairs with the chrominance-sensing elements of one line appearing in different columns of the sensor in relation to chrominance sensing elements of the other line.

2 Claims, 5 Drawing Sheets

| | | | | | | | | | |
|---|---|---|---|---|---|---|---|---|---|
| FIELD 1 | G | G | G | R | G | G | G | R | LINE 1 |
| FIELD 2 | G | R | G | G | G | R | G | G | LINE 2 |
| FIELD 1 | G | G | G | B | G | G | G | B | LINE 3 |
| FIELD 2 | G | B | G | G | G | B | G | G | LINE 4 |
| FIELD 1 | G | G | G | R | G | G | G | R | LINE 5 |
| FIELD 2 | G | R | G | G | G | R | G | G | LINE 6 |
| FIELD 1 | G | G | G | B | G | G | G | B | LINE 7 |
| FIELD 2 | G | B | G | G | G | B | G | G | LINE 8 |

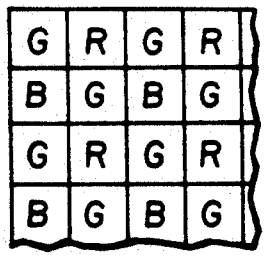
FIG. 1
(PRIOR ART)
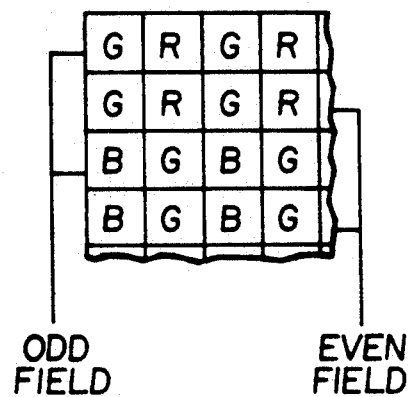
FIG. 2
(PRIOR ART)
```
G G G R G G G R G G G R G G G R
G G G R G G G R G G G R G G G R
G G G B G G G B G G G B G G G B
G G G B G G G B G G G B G G G B
G G G R G G G R G G G R G G G R
G G G R G G G R G G G R G G G R
G G G B G G G B G G G B G G G B
G G G B G G G B G G G B G G G B
```
FIG. 3
(PRIOR ART)

| | | | | | | | | | |
|---|---|---|---|---|---|---|---|---|---|
| FIELD 1 | | G | G | G | R | G | G | G | R | LINE 1 |
| FIELD 2 | | G | R | G | G | G | R | G | G | LINE 2 |
| FIELD 1 | | G | G | G | B | G | G | G | B | LINE 3 |
| FIELD 2 | | G | B | G | G | G | B | G | G | LINE 4 |
| FIELD 1 | | G | G | G | R | G | G | G | R | LINE 5 |
| FIELD 2 | | G | R | G | G | G | R | G | G | LINE 6 |
| FIELD 1 | | G | G | G | B | G | G | G | B | LINE 7 |
| FIELD 2 | | G | B | G | G | G | B | G | G | LINE 8 |

| FIELD 1 | G G G R G G G R | LINE 1 |
|---|---|---|
| 2 | G R G G G R G G | 2 |
| 1 | G G G B G G G B | 3 |
| 2 | G B G G G B G G | 4 |
| 1 | G G R G G G R G | 5 |
| 2 | R G G G R G G | 6 |
| 1 | G G B G G G B G | 7 |
| 2 | B G G G B G G | 8 |

FIG. 8

| FIELD 1 | G G G R G G G R | LINE 1 |
|---|---|---|
| 2 | G G R G G G R G | 2 |
| 1 | G B G G G B G G | 3 |
| 2 | B G G G B G G G | 4 |
| 1 | R G G G R G G | 5 |
| 2 | G R G G G R G G | 6 |
| 1 | G G B G G G B G | 7 |
| 2 | G G G B G G G B | 8 |

FIG. 9

SOLID STATE COLOR IMAGE SENSOR USING A FIELD-STAGGERED COLOR FILTER PATTERN

This is a continuation of application Ser. No. 646,130, filed Jan. 25, 1991.

BACKGROUND OF THE INVENTION

1. Field of the Invention

This invention relates to a color video camera, and in particular to a camera of the type employing a single color image sensor providing interlaced scanning of luminance and chrominance information for both fields of a television frame.

2. Background of the Invention

Luminance and chrominance information can be obtained from a single solid-state sensor by covering the photosites forming the sensor with a repetitive array of color filters. Since luminance is a combination of color information with a strong bias toward green, it is frequently based on just the green information provided by the sensor. The chrominance (color) content is frequently based on differences between the luminance (i.e., green information) and other primary colors (i.e., red and blue information). Each separate color is isolated by passing the scene light through an appropriate color filter before it strikes the sensor. As disclosed in "Color Filters and Processing Alternatives for One-Chip Cameras," by K. A. Parulski (*IEEE Trans. on Electron Devices*. ED-32, No. 8, August 1985, pp. 1381–1389), many different color filter array patterns have been used in single-sensor color video cameras. One example is the "Bayer" checkerboard pattern, which is disclosed in U.S. Pat. No. 3,971,065. The basic Bayer pattern is shown in FIG. 1; when interlaced scanning of two fields is desired, the modified Bayer pattern as shown in FIG. 2 is used.

Due to the interlaced scanning employed in present video standards such as NTSC and PAL, the color filter array patterns on video sensors are normally designed so that the image sampling is the same for each of the two video fields. For example, the odd field sampling is identical to the even field sampling for the prior art pattern of FIG. 2. The use of interlaced readout, however, does not require that this sampling be the same, but only that each field include both red and blue photoelements. An interlaced image sampling pattern can still be obtained if the chrominance sample positions are shifted from one field to another. For instance, U.S. Pat. No. 4,479,143 discloses a further modified Bayer pattern (see FIG. 4) in which red and blue sensor elements are provided at the same sampling rate as the green sensor elements, when horizontal alignment is considered. This arrangement provides improved chrominance resolution in the horizontal direction.

The color filter shown in FIG. 3 is representative of a newer type of filter used in a single sensor camera for improved image quality. In this filter, which is described in relation to a camera disclosed in U.S. Pat. No. 4,663,661, the green information (luminance) is sampled three times as frequently as red and blue information because it contributes more significantly to image resolution. Accordingly, an image sensor using this filter contains three green "luminance" pixels for every one red or blue "chroma" pixel. One problem is the occurrence of some amount of color edge artifacts (also referred to as aliasing) on horizontal chrominance edge transitions. Because the red and blue photosites only occur in every 4th column of the sensor, a linear interpolation used to form the interpolated red and blue signal values from the nearby red, green, and blue sensor values can create some slight artifacts on colored edges.

SUMMARY OF THE INVENTION

The present invention involves an improved interlaced readout of color filter arrays of the type exemplified by FIG. 3, wherein at least 75% of the image sensing elements are luminance sensing elements and the rest are either of two types of chrominance sensing elements. In particular, the chrominance sensing elements of the same type are separated in the horizontal scanning direction by at least three luminance sensing elements. According to the present invention, and despite the relatively wide spacing of the luminance samples, the horizontal resolution can be improved by using interlaced readout patterns of color elements that form a repetitive "grid" of samples in which the chrominance sensing elements are disposed in different columns of the sensor.

The invention improves upon the existing arrays by arranging the horizontal lines containing the chrominance sensing elements in line pairs with the chrominance sensing elements appearing in different columns of the sensor, thereby increasing the horizontal sampling frequency of the chrominance sensing elements. In one embodiment, the lines are staggered in each line pair such that chrominance sensing elements of the first line of each line pair are shifted by half the distance between the chrominance sensing elements of the second of each line pair, thereby appearing in every other column of the array. In another embodiment, alternate line pairs are themselves staggered in a "grid" of elements such that chrominance sensing elements of the same type appear in every column of the array.

BRIEF DESCRIPTION OF THE DRAWINGS

The prior art and the invention are described in relation to the drawings, in which:

FIG. 1 is an example of an image sensor employing a known "Bayer" checkerboard color filter pattern;

FIG. 2 is an image sensor employing the color filter pattern of FIG. 1 as modified to provide both television fields of an interlaced scanning pattern;

FIG. 3 is an image sensor employing a known color filter pattern in which 75% of the color elements are responsive to luminance;

FIG. 8 is a first alternative embodiment of a color filter array useful with the image sensor shown in FIG. 5; and FIG. 9 is a second alternative embodiment of a color filter array useful with the image sensor shown in FIG. 5.

DETAILED DESCRIPTION OF THE INVENTION

Figure 4:
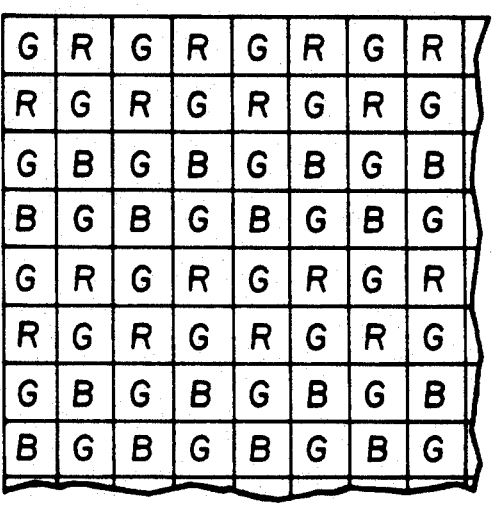
FIG. 4 is an image sensor employing a known variation of the color filter pattern of FIG. 2.
Figure 5:
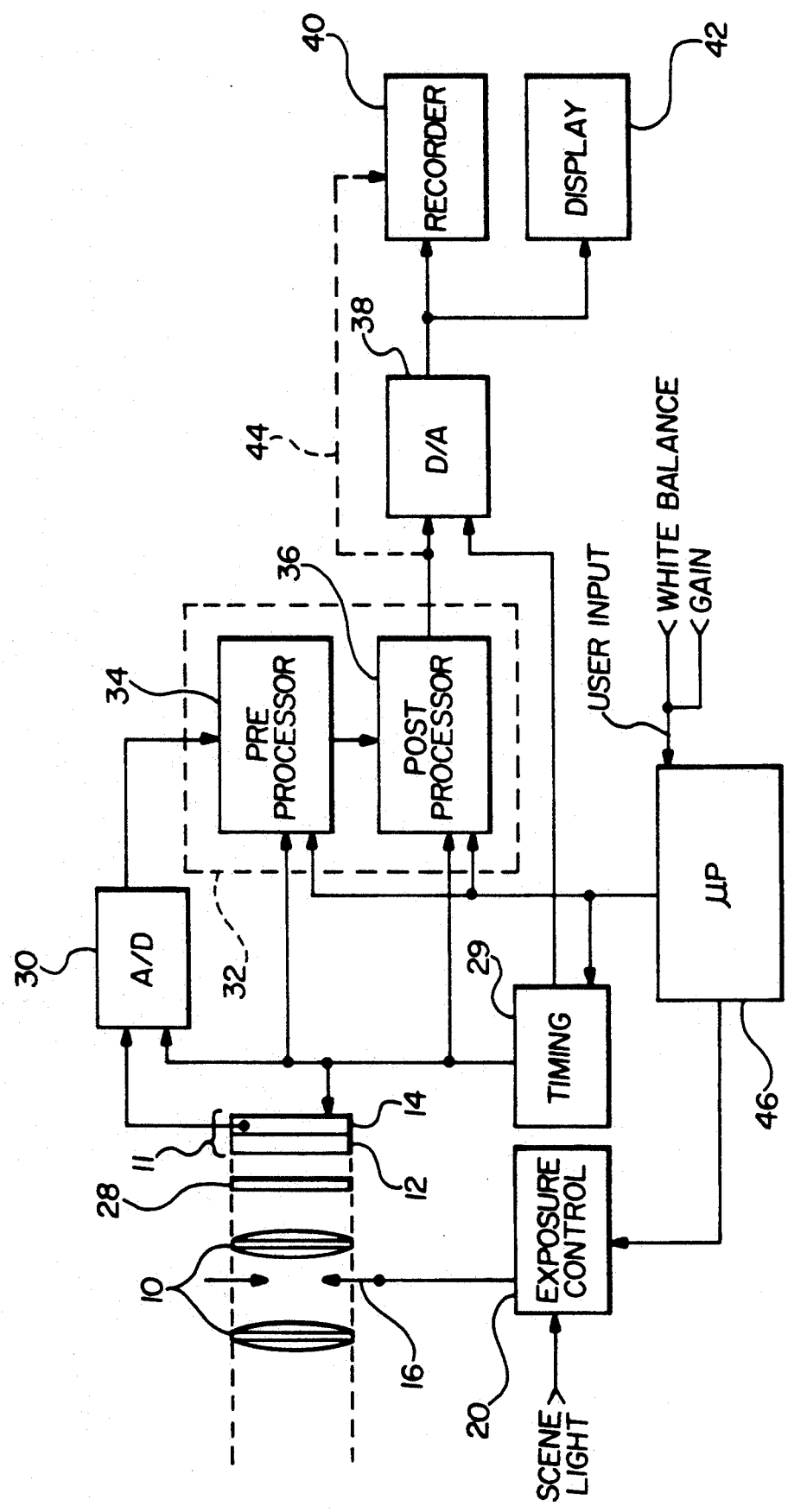
FIG. 5 is a block diagram of a video camera incorporating a single color image sensor with color filtering "staggered" according to the invention.

FIG. 5 identifies the basic elements of a video camera including a single solid state color image sensor of the type embodied by the invention. Other elements of the camera, either omitted or not shown in detail, may be readily selected from like elements known in the art. For example, the exposure control, recorder and display sections of the camera, which are not essential to an understanding of the invention, may be provided by ordinary components well known in this art. The microprocessor control system and the timing circuit may be implemented in a wholly conventional manner using available components and techniques. Moreover, although the color image sensor is disclosed in connection with a video camera, the invention is not necessarily related to this mode of image capture and, for example, could be incorporated into a film-to-video converter or a still video system.

Referring to FIG. 5, the video camera includes an optical section 10 for directing image light from a subject (not shown) to a solid state color image sensor 11. The image sensor 11 includes an array 12 of color filter elements covering a like array 14 of image sensing elements. A diaphragm 16 regulates the optical aperture through which image light passes. As is well known, exposure is a function of light intensity and sensor integration time, which are respectively controlled by the diaphragm 16 and the timing circuit 29. A sample of the scene light is input to an exposure control circuit 20, which automatically operates the diaphragm 16.

Figures 6, 7:
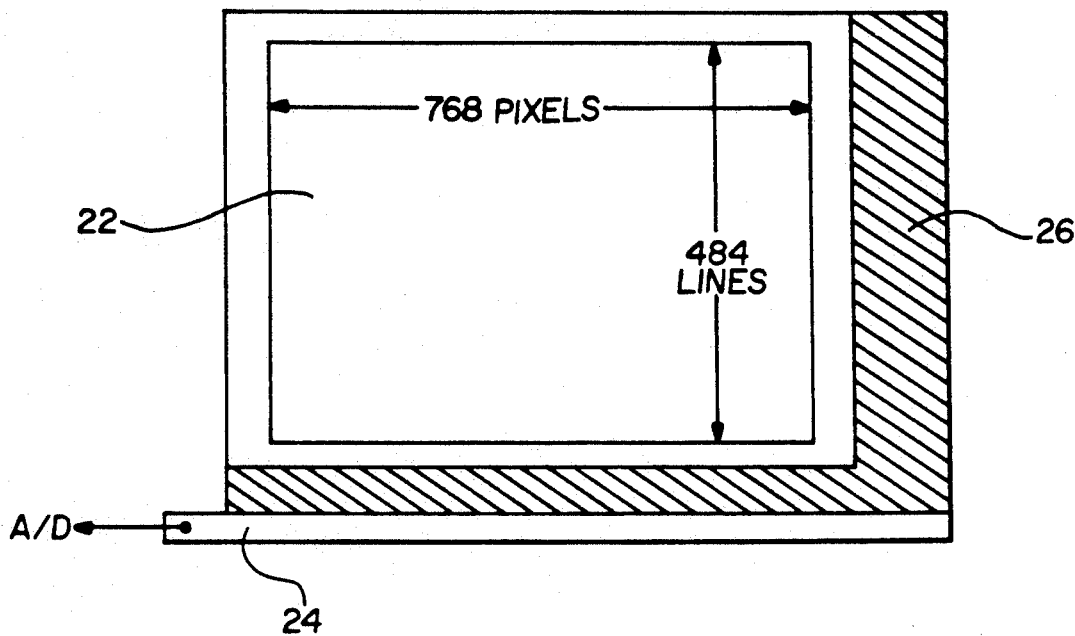
FIG. 6 is a plan view of the image sensor shown in FIG. 5.
FIG. 7 is a diagram of a preferred color filter array used in connection with the image sensor shown in FIG. 5.

The image sensor 11 is shown in plan view in FIG. 6. For purposes of illustrating a typical application, the sensor 11 includes an active image area 22 having a horizontal resolution of 768 pixels and a vertical resolution of 484 lines. (The invention, however, is not limited to any particular configuration or size of image sensor.) The pixels are arranged in a known interline transfer configuration in which separate fields are transferred line by line to an output register 24. A preferred interline transfer image sensor having the resolution of FIG. 6 may be obtained from the Eastman Kodak Co., Rochester, N.Y. as catalog item KAI0370. A cross-hatched area 26 shows a region of dark lines and dark pixels which are used to obtain an indication of the sensor "dark current" level.

FIG. 7 shows a preferred color filter geometry according to the invention for the color filter array 12, which is an improvement upon a "three-green" color filter geometry of the type disclosed in U.S. Pat. No. 4,663,661 and shown in FIG. 3, which is assigned to the assignee of the present invention and incorporated by reference into the present description. This type of filter produces red, green and blue signals, which can also be considered luminance (green) and chrominance (red or blue) colors. To implement the type of interpolation processing disclosed in that patent, a blurring filter 28 (FIG. 5) is placed in front of the color filter 12 to prefilter the image light in order to provide a known spread function. (It is to be further noted, however, that with other processing techniques, the blurring filter 28 may be altered or omitted.)

In accordance with the embodiment of the invention shown in FIG. 7, the "three-green" color filter array is additionally arranged in a "field-staggered" geometry in which the red and blue pixels are spaced every second pixel horizontally, rather than every fourth pixel (as in FIG. 3). More particularly, the chrominance sensing elements of the same type (e.g., red) are arranged in line pairs (e.g., lines 1 and 2, 5 and 6, etc.) in which chrominance sensing elements of the first line of each pair are shifted by half the distance between the chrominance sensing elements of the second line, thereby appearing in every other column of the sensor. This provides a more checker-board-like arrangement of red and blue pixels which increases the horizontal sampling frequency of the red and blue image records by a factor of two, thus improving the horizontal resolution of the red and blue records. In addition, the green (luminance) pixels are maximally checkerboarded, that is, the spacing between chrominance locations is made uniform by having each chrominance location completely surrounded by an array of green pixels. As a result, the missing green information (for each chrominance location) can be more accurately reconstructed than from color filter arrays where the chrominance locations are not completely surrounded by green pixels.

The color filter array 12 as shown in FIG. 7 is disclosed in relation to a specific embodiment of the invention, and alternative configurations are possible. Two alternative configurations are shown in FIGS. 8 and 9. In both of these patterns, the horizontal lines containing the chrominance sensing elements are arranged in a repetitive grid of lines with the chrominance sensing elements appearing in each column of the sensor. More specifically, the repetitive grid includes two line pairs (e.g., line pairs 1 and 2, and 5 and 6) containing chrominance sensing elements of a first type (e.g., red) interleaved between two line pairs (e.g., line pairs 3 and 4, and 7 and 8) containing chrominance sensing elements of a second type (e.g., blue) such that chrominance sensing elements of the same type appear in every column of the sensor. Both of these patterns, therefore, have the desirable property that red and blue samples occur in every column of the array, thus further improving the horizontal resolution of the red and blue records. The "field-staggered" pattern of FIG. 8 may be preferred in some situations because the sampling is more uniformly arranged.

In FIG. 5, a timing circuit 29 is provided for clocking the image signal from the output register 24 (FIG. 6) of the image sensor 11 to an analog-to-digital (A/D) converter circuit 30 and for generally sequencing other sections of the camera. The digital signal generated by the A/D converter 30 is output as a stream of color signals comprising, for the color filter array of FIG. 7, a sequence of red (or blue) signals separated by three green signals. The quantized color signals are applied to a digital signal processing circuit 32 composed of two sections: a pre-processor section 34 and a post-processor section 36. The signal provided to the digital processing circuit 32 is partial resolution color data from the image sensor 11, that is, an un-interpolated sensor signal incorporating any anomalies due to the black level of the sensor or to any color and density irregularity in the scene. The signal output from the circuit 32 is a fully corrected, full resolution multi-color signal.

More particularly, the pre-processor section 34 initially provides black-level clamping and luminance interpolation for the quantized image signals. A stable sensor black reference value for black-level clamping is based on a sample of dark current signal values from pixels in the non-displayed and non-imaged dark area 26 of the image sensor 11 (FIG. 6). Prior to luminance interpolation, the clamped signals are processed for defect concealment by substituting, for defective pixels, the value of the closest previous horizontally adjacent pixel of the same color. The chroma values are converted to hues, that is, the ratio of red or blue to green, and chroma interpolation is performed upon the hue values. A white balance offset and a gain offset are also applied to the hue signal. The output of the pre-processor 34 are red, green, and blue signals formed from a combination of the interpolated hue values and the interpolated green values.

In the post-processor 36, the black level of the red, green, and blue signals is corrected for lens flare. The corrected signals are then color matrixed in order to properly correct the spectral sensitivities of the image sensor for the chromaticities of the display, and then gamma-corrected to adjust the non-linear contrast relationship between signal voltages at the input (sensor 11) and the light values at the output (display) of the system. The further corrected signals are then edge-enhanced and output from the post-processor 36. The digital processor 32 is further described in U.S. Pat. No. 5,008,739, entitled "Real-Time Digital Processor for Producing Full Resolution Color Signals from a Multi-Color Image Sensor," which was filed Feb. 13, 1989 and assigned to the same assignee as the present invention. As shown in U.S. Pat. No. 5,008,739, it is beneficial to have one type of chrominance sample per line so that only one chrominance processing circuit is necessary. The circuit is then switched between red or blue from line to line. Dual chrominance processing circuits (red and blue) are thus unnecessary. In that connection, it is noteworthy that the color filter array of FIG. 7 is configured to have the same type of chrominance sample per line, while preserving the aforementioned maximal checkerboarding of green pixels.

The fully corrected color signals from the digital processor 32 are converted to analog signals by a digital-to-analog (D/A) converter 38 and are sent to either a conventional recorder 40 or to a display device 42. (The broken line 44 is meant to indicate that the color signals may be directly recorded in a digital storage device, if such is the choice.) A microprocessor 46 controls the operation of the camera and allows for user entry of pre-processing information, such as gain offset and color balance, to the pre-processor 34.

The invention has been described in detail with particular reference to a presently preferred embodiment, but it will be understood that variations and modifications can be effected within the spirit and scope of the invention. For example, although the sensor elements have been described as being covered with primary color filters, that is, red, green, and blue, they can also be covered with complementary color filters. For example, the red and blue filters can be replaced with yellow and cyan filters. In such a filter grid, green might be replaced by white.

What is claimed is:

1. Color image sensing apparatus of the type used for interlaced scanning of a color image sensor having an area array of color filter elements covering a like array of image sensing elements, the array of color filter elements being configured in horizontal lines and vertical columns in relation to the image sensor such that at least 75% of the image sensing elements of each line are green sensing elements and the rest of the elements of each line are either red or blue chrominance sensing elements, the chrominance sensing elements of the same type for each line being separated in a horizontal line direction by at least three green sensing elements, said color image sensing apparatus comprising:

a sensor having a two-dimensional array of sensing elements and a single horizontal read out register for separately reading out first and second fields, said sensor having a configuration in which the horizontal lines containing the chrominance sensing elements of the same type are arranged in line pairs with the chrominance sensing element of the first line of said line pairs being shifted by half the distance between the chrominance sensing elements of the second line of said line pairs, whereby chrominance sensing elements appear in every other column of the sensor to increase the horizontal sampling frequency of the chrominance sensing elements while totally surrounding each chrominance element with green elements to increase the accuracy of the luminance reconstruction; and means for providing interlaced scanning of said sensor through said single horizontal read out register in a configuration of odd and even video fields, the odd field read out through said register including the first of said lines of said line pairs, and the even field read out through said register including the second of said lines of said line pairs.

2. Apparatus as claimed in claim 1 in which the horizontal lines containing the red elements are arranged in first line pairs and the horizontal lines containing the blue elements are arranged in second line pairs, and the first and second line pairs are further arranged adjacently in a pattern that repeats every four lines such that the red and blue elements appear in every other column of the sensor.

* * * * *